United States Patent [19]

Agren et al.

[11] Patent Number: 4,929,409
[45] Date of Patent: May 29, 1990

[54] METHOD IN MANUFACTURING A HEAT INSULATED TUBE AND A DEVICE IN EXTRUDERS FOR MANUFACTURING THE TUBE

[75] Inventors: Lennart Ågren, Borås; Eino Hölsö, Viskafors, both of Sweden

[73] Assignee: Oy Uponor AB, Nastola, Finland

[21] Appl. No.: 307,196

[22] Filed: Feb. 3, 1989

Related U.S. Application Data

[63] Continuation of Ser. No. 940,764, filed as PCT SE86/00105 on March 12, 1986, published as WO86/05570 on Sept. 25, 1986, abandoned.

[30] Foreign Application Priority Data

Dec. 3, 1985 [SE] Sweden .................. 8501212

[51] Int. Cl.⁵ .............................. B29C 47/28
[52] U.S. Cl. ................... 264/508; 156/203; 156/244.14; 156/244.23; 156/500; 264/511; 264/515; 264/565; 264/568; 264/173; 425/112; 425/113; 425/516; 425/325; 425/396
[58] Field of Search .......... 264/508, 568, 511, 515, 264/173, 174, 46.1; 425/113, 112, 114, 325, 504–509, 516, 380, 381, 396, 467, 466, 326.1; 156/203, 201–202, 244.12–244.14, 244.23, 500

[56] References Cited

U.S. PATENT DOCUMENTS

| 3,118,800 | 1/1964 | Snelling ................. 264/173 |
| 3,346,921 | 10/1967 | Bunish et al. ............ 425/113 |
| 3,432,885 | 3/1969 | Zanini .................... 425/381 |
| 3,487,506 | 1/1970 | Lanfranconi ............. 425/380 |
| 3,660,000 | 5/1972 | Yoshida et al. ........... 425/380 |
| 3,743,456 | 7/1973 | Cini ..................... 425/112 |
| 3,876,355 | 4/1975 | Baughmann ............... 425/113 |
| 3,994,644 | 11/1976 | Hegler et al. ........... 264/173 |
| 3,994,646 | 11/1976 | Hauck ................... 425/396 |
| 3,998,579 | 12/1976 | Nordstrom ............... 425/396 |
| 4,144,111 | 3/1979 | Schaerer ................ 156/244.14 |
| 4,322,260 | 3/1982 | Conlon .................. 264/46.1 |

FOREIGN PATENT DOCUMENTS

| 2413877 | 6/1978 | Fed. Rep. of Germany . |
| 2165506 | 6/1982 | Fed. Rep. of Germany . |
| 3208724 | 9/1983 | Fed. Rep. of Germany . |
| 58-82738 | 5/1983 | Japan .................. 264/173 |
| 7316972 | 6/1974 | Netherlands ............ 264/508 |
| 7608579 | 2/1977 | Netherlands ............ 264/173 |
| 453481 | 8/1936 | United Kingdom . |
| 762029 | 11/1956 | United Kingdom . |
| 862006 | 3/1961 | United Kingdom . |
| 1453068 | 10/1976 | United Kingdom . |
| 1462431 | 1/1977 | United Kingdom . |
| 1482661 | 8/1977 | United Kingdom . |
| 2099542A | 12/1982 | United Kingdom ........ 264/173 |

Primary Examiner—Jeffery Thurlow
Attorney, Agent, or Firm—Merchant, Gould, Smith, Edell, Welter & Schmidt

[57] ABSTRACT

Method in manufacturing a heat insulated tube includes a tube (17) for conducting fluid and a sheath (12) enclosing said tube, a heat insulating material (15) being disposed between the fluid tube and the sheath. The sheath is being extruded in an angle extruder die (10) while the fluid tube and the heat insulating material enclosing said tube are being fed axially through the angle extruder die as the sheath is being extruded around the heat insulating material. Then the sheath (12) extruded from the angle extruder die is kept spaced from the heat insulating material (15) enclosing the fluid tube (17), over an initial length of the axial movement thereof up to chains of chill molds (13) for imparting to the sheath a corrugated shape by forming the sheath against the chains of chill molds under the influence of negative pressure. The invention also relates to a device in extruders having an angle extruder die (10) for the manufacture of the heat insulated tube. wherein a sleeve (20) is provided in the angle extruder die, said sleeve defining a passage for the heat insulating material (15) and the fluid tube (17) enclosed by said material, from the angle extruder die up to the chains of chill molds (13).

10 Claims, 1 Drawing Sheet

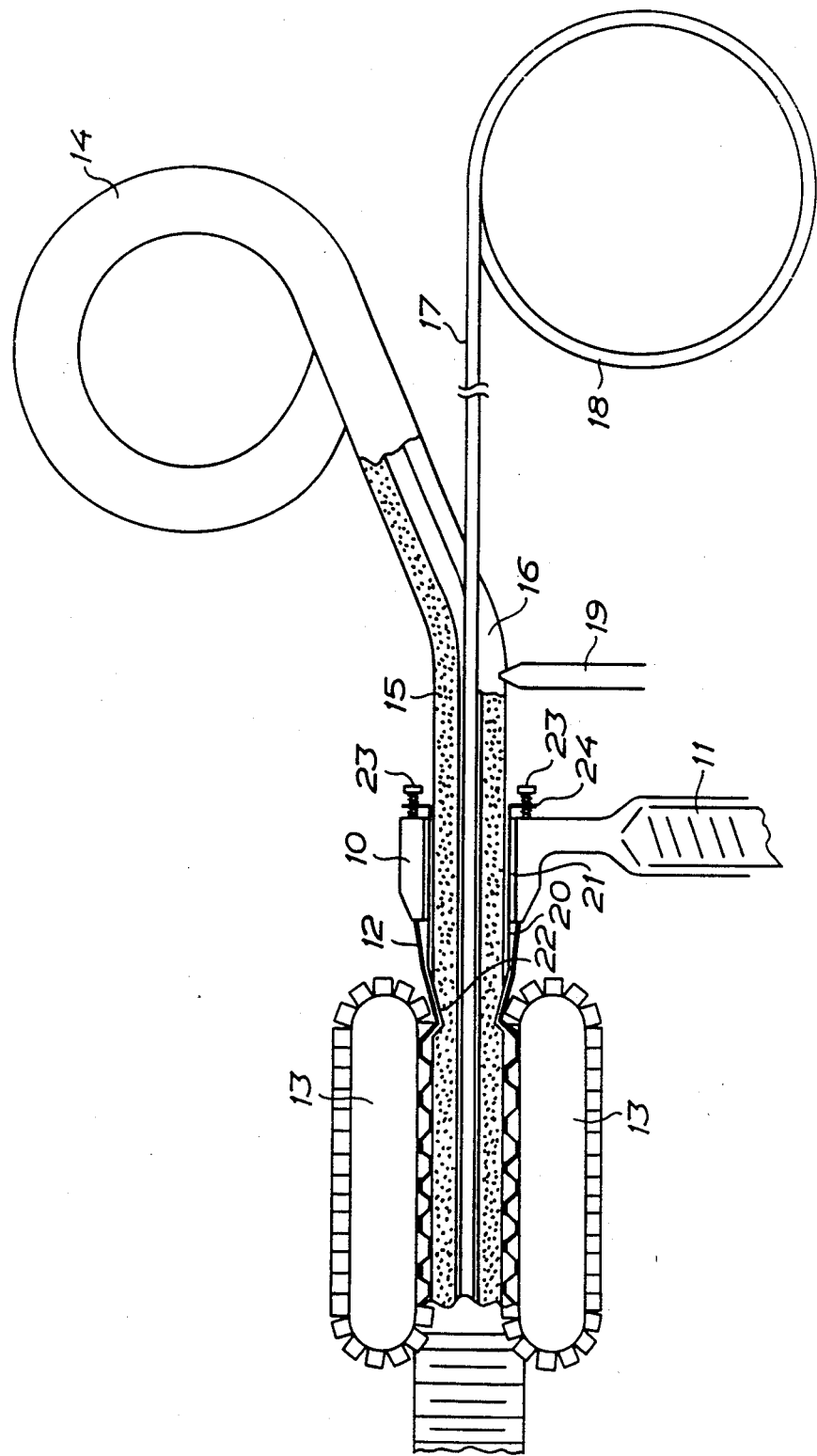

METHOD IN MANUFACTURING A HEAT INSULATED TUBE AND A DEVICE IN EXTRUDERS FOR MANUFACTURING THE TUBE

This is a continuation of application Ser. No. 940,764, filed as PCT SE86/00105 on March 12, 1986, published as WO86/05570 on Sept. 25, 1986, abandoned.

The present invention relates to a method in manufacturing a heat insulated tube comprising a tube for conducting fluid and a sheath enclosing said tube, a heat insulating material being disposed between the fluid tube and the sheath, wherein the sheath is being extruded in an angle extruder die while the fluid tube and the heat insulating material enclosing said tube are being fed axially through the angle extruder die as the sheath is being extruded around the heat insulating material.

The invention has been developed particularly for manufacturing heat culvert tubes which are used as secondary culvert conduits from a sub-station in a residential area to individual consumers in a remote heating system, the fluid tube carrying water at a temperature of 70° to 80° C., and for manufacturing heat insulated tapwater tubes. At present there are used in this connection mostly fluid tubes comprising copper or steel tubes, which means that the heat culvert tube or the tapwater tube is stiff and therefore is cumbersome to handle, the laying of heat culvert tubes moreover being expensive because it is necessary to provide expansion means in the heat culvert conduit made up of such tubes.

It is known to apply the heat insulating material on the fluid tube in different ways. This material can be foamed in situ around the fluid tube, or heat insulating material comprising a tape can be wound or wrapped around the fluid tube.

In a prior art embodiment of the method mentioned above in manufacturing a heat insulated tube a smooth sheath is extruded around the heat insulating material the sheath which is sticky when leaving the angle extruder die, adhering to the surface of the heat insulating material. Such a smooth sheath has a low circumferential stiffness, and it had been better if the sheath could be made corrugated in the same manner as applied to drain and sewage tubes, but since the sheath adheres to the heat insulating material filling the interior of the sheath it is not possible to corrugate the sheath by shaping against chains of chill molds under the influence of positive or negative pressure. Therefore, it is customary to use a heat insulating material having high density in order to reduce the risk of flattening of the heat insulated tube.

The corrugated sheath provides a greater circumferential stiffness than a smooth sheath. Owing to the increased circumferential stiffness a heat insulating material having a lower density can be used without the risk of flattening, which means a lower price and an improved heat insulation. Moreover, the corrugated sheath and the softer heat insulation imparts to the tube increased flexibility which is particularly advantageous if the fluid tube is flexible and consists for example of plastic material because in that case the tube can be wound up so as to be stored and distributed as a coil. Accordingly, the handling and laying of the tubes will be facilitated and cheapened.

The invention also relates to a device in extruders having an angle extruder die.

In order to explain the invention in more detail it will be described below with reference to the accompanying drawing which discloses diagramatically the method and device of the invention.

BRIEF DESCRIPTION OF THE DRAWING

FIG. 1 is a diagramatic view of a device for manufacturing heat insulated tubing including an extruder.

DETAILED DESCRIPTION OF THE PREFERRED EMBODIMENT

In the drawing an angle extruder die 10 is shown which is connected to a conventional extruder 11. From the angle extruder die a sheath 12 of suitable plastic material, for example polyethylene or PVC is extruded. Then, a helical or annular corrugation is imparted to said sheath by means of two chains of chill molds 13 in a manner which is known per se by applying a negative pressure in the molds. From a coil 14 a tube 15 of heat insulating material is led through the angle extruder die 10. This tube can consist of foamed polyurethane. It forms an axial slot 16 in order to be passed onto a fluid tube 17 at the introduction. The fluid tube can consist of crosslinked polyethylene (PEX) or polybutene and is supplied from a coil 18. Before the tube 15 passes into the angle extruder die the surfaces of the slot 16 are coated or sprayed with an adhesive by means of an adhesive applicator 19. The tube 15 can be coated on the outside surface thereof with some release agent such as a silicon composition. The tube can be produced by extrusion, in a separate operation of course, and then be slotted.

As the sheath 12 is being extruded the fluid tube 17 thus is introduced therein enclosed by the heat insulating tube 15 but the sheath should not be allowed to contact the tube 15 immediately after the emergence from the angle extruder head 10. It should be kept spaced from the tube 15 up to the chains 13 of chill molds in order not to stick to and/or tightly enclose the tube. For this purpose a metal sheet sleeve 20 is provided inside the angle extruder head 10 to define a passage for the tube 15 of heat insulating material, which is thus fed into and through the sleeve 20 together with the fluid tube 17 enclosed by the heat insulating material. The sleeve 20 is burnished on the outside surface thereof and is coated with polytetrafluoroetylene on the inside surface thereof. Between the outside surface of the sleeve and the angle extruder die a gap 21 is provided of the order of 20 to 25 mm such that the sleeve will not be heated by the hot angle extruder die. The gap may be filled with a heat insulating material. The downstream end of the sleeve, i.e. the lefthand end as seen in the FIGURE, forms a conical end portion 22 so that the tube 15 passing through the sleeve will be somewhat compressed just as it leaves the sleeve. This end should be placed close to the chains of chill molds 13, and in order to make possible that the position of the sleeve is adjusted set screws 23 are provided between the angle extruder die and a flange 24 at the other end of the sleeve 20 for adjustment of the sleeve axially. The sheath 12 emerging from the angular extruder head thus passes on the outside surface of the sleeve right up to the chains of chill molds and only there the sheath is brought into contact with the tube 15 of heat insulating material so as to make possible that the sheath is corrugated by being pressed against the chains of chill molds under the influence of negative pressure said molds being shaped so as to provide the desired corrugation either a helical corrugation or an annular corrugation.

In order to glue together the tube 15 around the fluid tube 17 press means such as press rollers or sliding jaws can be provided between the adhesive applicator 19 and the extruder die 10 to press together the surfaces coated with adhesive before the tube 15 passes into the extruder die. It should be mentioned that the slot 16 can be closed in a way different from glueing for example by heat welding the surfaces of the slot to each other.

Owing to the fact that the sheath 12 is corrugated bending of the finished heat insulated tube will be facilitated without the heat insulating material, i.e. the tube 15 being compressed due to the fact that the sheath 12 is folded at bending of the heat insulated tube as in case of a smooth sheath tube. Since the corrugated sheath is stiffer than a smooth sheath and the risk of the heat insulated tube being flattened therefore is considerably less than in case of a smooth sheath, a heat insulating material of lower density can be used; the density can be as low as 30 kg/m as compared with 80 kg/m which is common for tubes having a smooth sheath. At this density about $\frac{1}{3}$ of material will be required the heat losses at the same time being reduced. By applying the invention a cheaper tube thus will be obtained which causes lower heat losses.

The chains of chill molds also function as a feeder unit which contributes to the discharge of the finished heat insulated tube from the extruder die.

We claim:

1. Method for manufacturing a heat insulated tube including an inner tube for conducting fluid, a heat insulating layer enclosing said inner tube, and a sheath covering the heat insulating layer, comprising the steps of:
   feeding the inner tube and the insulating layer enclosing the inner tube axially through an angle extruder, extruding the sheath from the angle extruder around the heat insulating layer radially spaced therefrom,
   maintaining the sheath spaced from the insulating layer when moving together with said layer and said inner tube, over an initial distance from the angle extruder, and
   forming said sheath against chill molds under the influence of negative pressure downstream of said initial distance for compressing said sheath toward the insulating layer and imparting a corrugated shape to the sheath.

2. The method as in claim 1 including the step of slightly compressing the insulating material where the sheath and the heat insulating material are contacted with each other after having moved along said initial distance.

3. The method as in claim 1 including the step of feeding the heat insulating material, as a prefabricated slotted tubular covering, onto the inner tube to receive the inner tube therein through the slot of the covering.

4. In an extruder having an angle extruder die defining a passage for prefabricated tubing having an insulating layer and overlying sheath, the improvement comprising sleeve means projecting from said angle extruder die coaxially with said passage and forming an extension of the passage at the outlet of the angle extruder die and corrugation means at the downstream end of said sleeve, said means together extruding and then corrugating the sheath onto said insulating layer, said corrugation means comprising chill molds forming said sheath under the influence of negative pressure.

5. The extruder according to claim 4 wherein the sleeve means is mounted for axial adjustment.

6. The extruder according to claim 4 wherein the sleeve means extends into said passage a gap being provided between the sleeve means and the angle extruder die.

7. The extruder according to claim 6 wherein a heat insulating is provided in said gap.

8. The extruder according to claim 4 wherein the sleeve means at the downstream end thereof forms a coaxially narrowing end portion.

9. Method for manufacturing a heat insulated tube including an inner tube for conducting fluid, a heat insulating layer enclosing said inner tube, and a sheath covering the heat insulating layer, comprising the steps of feeding the inner tube and the insulating layer axially through an angle extruder, extruding the sheath from the angle extruder around the heat insulating layer radially spaced therefrom, maintaining the sheath spaced from the insulating layer when moving together with said layer and said inner tube, over an initial distance from the angle extruder, and compressing the heat insulating layer against the inner tube at the end of said initial distance, where the sheath is contacted with the heat insulating layer, and then forming said sheath against chill molds under the influence of negative pressure for imparting a corrugated shape to the sheath.

10. Method as claimed in claim 9 wherein the heat insulating layer as a prefabricated slotted tube is fed into the angle extruder together with the inner tube.

* * * * *